Figures 1, 4, 5:
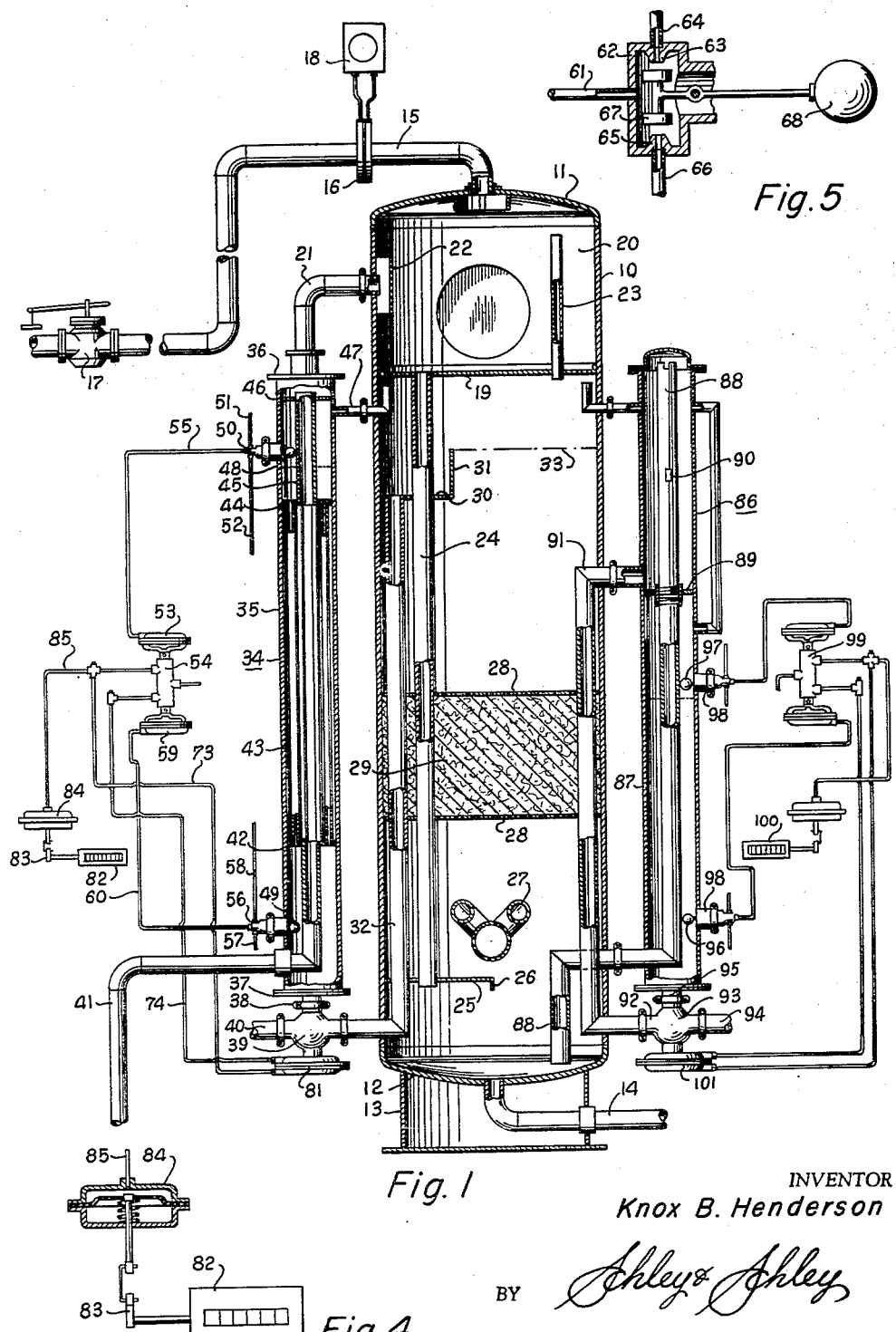

June 14, 1960     K. B. HENDERSON     2,940,310
METERING EMULSION TREATERS
Filed Dec. 14, 1956     2 Sheets-Sheet 1

INVENTOR
Knox B. Henderson
BY
ATTORNEYS

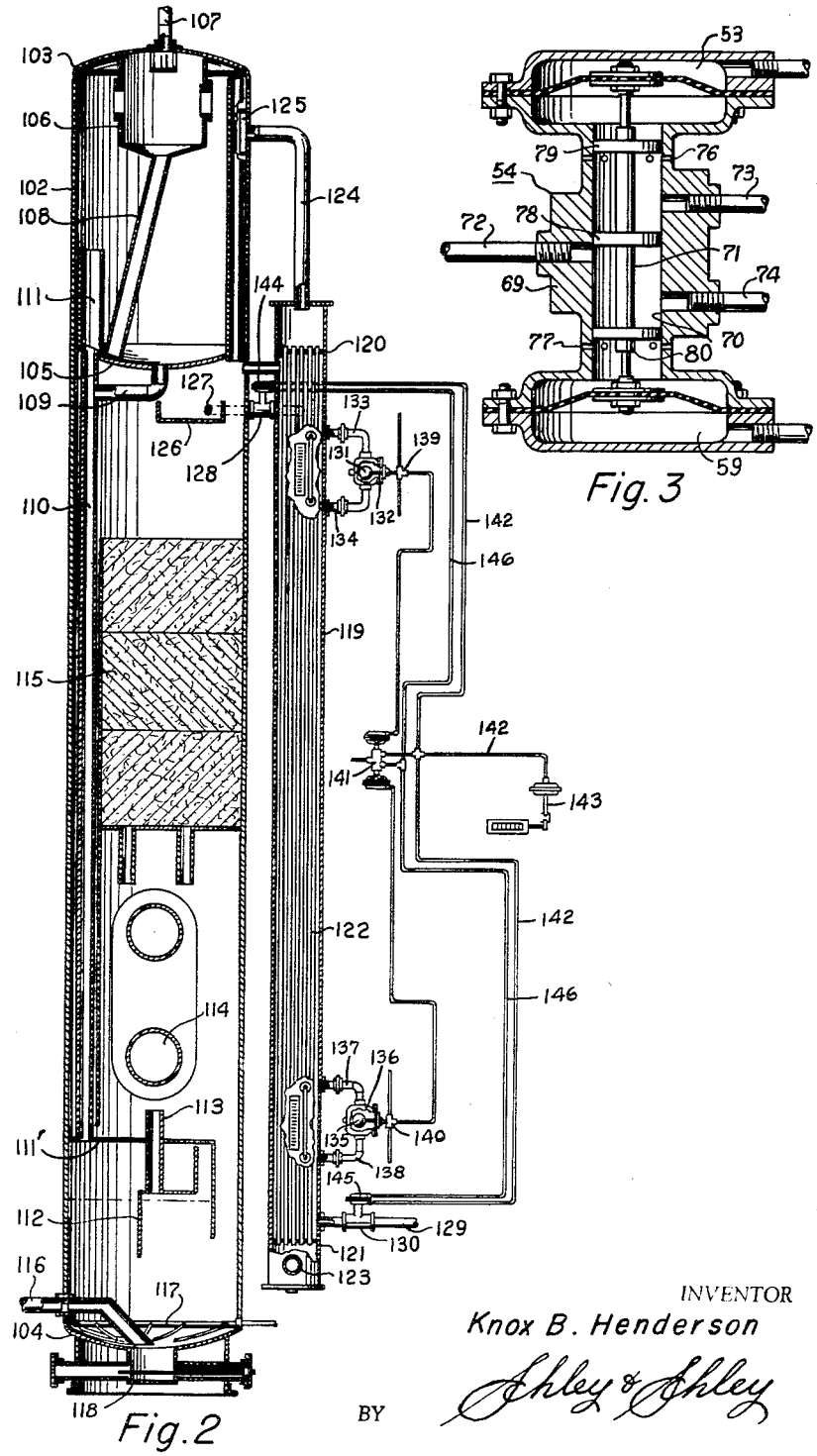

United States Patent Office 2,940,310
Patented June 14, 1960

2,940,310

METERING EMULSION TREATERS

Knox B. Henderson, Tulsa, Okla., assignor to National Tank Company, Tulsa, Okla., a corporation of Nevada Filed Dec. 14, 1956, Ser. No. 628,361

6 Claims. (Cl. 73—200)

This invention relates to new and useful improvements in metering emulsion treaters.

The invention is particularly concerned with emulsion treaters for petroleum well streams in which the volume of recovered clean oil may automatically be determined and recorded, and in which the volumetric measuring chamber for the clean oil is simultaneously employed as a heat exchanger for cooling the clean oil and pre-heating the incoming emulsion stream.

Another object of the invention is to provide an improved emulsion treater of the character described in which both the volume of water and oil separated from the emulsion stream may be determined and recorded, and in which the volume of separated gas may also be recorded on a continuous basis.

A construction designed to carry out the invention will be hereinafter described, together with other features of the invention.

The invention will be more readily understood from a reading of the following specification and by reference to the accompanying drawings, wherein examples of the invention are shown, and wherein:

Fig. 1 is a vertical, sectional view illustrating an emulsion treater constructed in accordance with this invention, Fig. 2 is a vertical, sectional view of an emulsion treater constructed in accordance with this invention and illustrating modifications thereof, Fig. 3 is a longitudinal, sectional view of the switching valve structure, Fig. 4 is a view partly in elevation and partly in section illustrating the pressure-actuated counter, and Fig. 5 is a sectional view of one of the pilot valves.

In the drawings, the numeral 10 designates an upright vertical tank having a dished upper head 11 and a concave bottom head 12. The tank is carried upon the usual base or support 13 and has a bottom drain conductor 14 leading from the bottom head 12. A gas outlet conductor 15 leads from the upper head 11 through an orifice plate fixture 16 and a back pressure valve 17. A continuously recording gas volume meter 18 is desirably connected into the fixture 16 for maintaining a constant record of the volume of gas discharged from the vessel.

The vessel 10 is provided with a transverse partition 19 spaced below the upper head 11 and defining an upper, preliminary gas separation compartment 20 into which an emulsion inlet conductor 21 opens through a tangential diverter 22. A gas equalizing pipe 23 extends upwardly through the partition 19 into the upper portion of the compartment 20 for equalizing pressures above and below said partition. The emulsion stream, which will have been subjected to some preliminary or initial heating, is directed tangentially onto the walls of the compartment 20 and subjected to a scrubbing and separating action whereby a large portion of the gas present in the emulsion stream is separated for removal through the outlet conductor 15. The predominantly liquid portion of the emulsion stream settles onto the partition 19, thus maintaining the partition at the temperature of the incoming emulsion stream which is normally somewhat below that of the fluids below the partition 19, and thus, the partition is maintained relatively cool with respect to the lower portion of the treating vessel.

The emulsion stream from which a portion of the gas has been removed, passes downwardly through a vertical flume 24 extending downwardly within the vessel 10 from the partition 19 and adjacent one side wall of the vessel to a point near the bottom thereof. The lower end of the flume 24 opens downwardly through a transverse, semi-partition 25 extending transversely of the lower portion of the vessel 10 from one side wall thereof to the medial portion of the vessel and terminating in a downwardly directed lip or flange 26. The emulsion stream will contain some quantities of free water, and additional quanities of water may have been released from the emulsion during the pre-heating step occurring prior to introduction of the emulsion stream into the chamber 20 as well as during its passage downwardly through the flume 24. Accordingly, the delivery of the emulsion below the partition 25 and the spreading of the emulsion into a relatively thin layer or stratum will permit quantities of free water to settle therefrom into the lowermost portion of the vessel while the lighter, or predominantly oil portions of the emulsion stream flow under the lip 26 and upwardly within the interior of the treating vessel.

A conventional heating or fire tube 27 extends transversely of the vessel above the inner margin or edge of the flange 25 so that the upwardly flowing emulsion stream passes thereover, or adjacent thereto, and is thereby heated to emulsion breaking temperatures. As will appear more fully hereinafter, the lower portion of the vessel also contains a body of heated water, and the emulsion stream is brought to the proper treating temperature by its passage through this body of hot water.

Above the heater tube 27, the vessel is provided with a pair of spaced, transverse, perforated partitions 28 between which a body 29 of coalescing material, such as wood excelsior or hay, may be positioned for aiding in the final breaking of the emulsion and the resolving thereof into clean oil and separated water. The water, of course, gravitates toward the lower end of the vessel 10 while the clean oil, due to its lighter weight, moves upwardly toward the partition 19.

Within the upper half of the vessel 10, there is provided a relatively large sump 30 having an upstanding side wall 31 over which the clean oil spills or skims so as to enter the sump 30 for removal from a clean oil outlet line 32 extending downwardly within the vessel and exiting therefrom immediately above the bottom 12. The sump 30 is of appreciable volume so that quantities of oil may accumulate therein during such times that outflow of oil through the conductor 32 is prevented, and further, the oil level 33 within the upper portion of the vessel may attain higher elevations within the vessel 10 so that quite considerable quantities of oil may be retained for short periods within the treater vessel without appreciably affecting the operation thereof. A combination heat exchange and clean oil metering structure 34 is mounted on the exterior of the vessel 10 and includes a vertical, cylindrical shell 35 having a top cap 36 and a bottom plate 37. The emulsion inlet conductor 21 is connected to the interior of the shell 35 through the head 36, and one conductor 38 of a diaphragm-operated, three-way valve 39 is connected into the lower portion of the shell through the bottom plate 37. The clean oil outlet conductor 32 is connected into the inlet of the three-way valve 39, and a clean oil discharge conductor 40 leads from the outlet of the valve 39. Thus, according to the position of the valve 39, clean oil is admitted to the interior of the shell 35 through the pipe 32, or discharged from the shell through the outlet conductor 40.

A well stream emulsion conductor 41 extends through the side wall of the shell 35 immediately above the bottom plate 37 and turns upwardly within the shell to open through a transverse partition or tube sheet 42 extending across the interior of the shell at a point spaced above the bottom plate 37. A plurality of small heat exchanger tubes 43 open downwardly through the tube sheet 42 into the interior of the lower portion of the shell around the conductor 41, and extend upwardly to an upper tube sheet 44 through which the tubes open into the upper portion of the heat exchanger shell. Thus, the incoming emulsion stream is directed through the pipe 41 and through the tube sheet 42 into the space within the intermediate portion of the shell 35 around the tubes 43 and between the tube sheets 42 and 44. A single emulsion stream conductor 45 extends upwardly from the upper tube sheet 44 through the upper portion of the shell 35 and through an upper partition 46 immediately underlying the top plate 36. With this structure, the upwardly rising emulsion stream is conducted from beneath the tube sheet 44, through the pipe 45 and into the space between the partition 46 and the top plate 36, from which point the emulsion stream flows upwardly through the conductor 21 into the preliminary separation chamber 20. Clean oil admitted through the conductor 38 of the valve 39 may rise in the lower portion of the shell 35 around the pipe 41 and pass upwardly through the tubes 43 into the space in the upper portion of the shell around the pipe 45. A gas equalizing conductor 47 extends between the upper portion of the shell immediately below the partition 46 and the upper part of the clean oil accumulation chamber within the vessel 10 immediately below the partition 19 for aiding and facilitating such flow of clean oil.

This simultaneous passage of clean oil and incoming emulsion stream through the single shell 35 brings the two streams into intimate, indirect heat exchange in which the warm clean oil is subjected to heat exchange with the relatively cool incoming emulsion stream through the large surface area of the tubes 43, as well as the conductors 41 and 45. By this means, the clean oil is cooled quite effectively before passing to storage, and the tendency of the clean oil to evolve vapors and light hydrocarbons is considerably reduced. At the same time, the heat imparted to the clean oil is conserved and transferred to the incoming emulsion stream for ultimate return to the interior of the treating vessel 10, and also, the emulsion stream receives some degree of desirable pre-heating for aiding in the evolution of gas therefrom in the chamber 20, as well as the initial separation or breaking of the looser portions of the emulsion stream into water and oil components.

For measuring the volume of clean oil discharged from the treating vessel and controlling the operation of the three-way valve 39, an upper float 48 and a lower float 49 are positioned within the shell 35 above and below the tube sheets 44 and 42, respectively. The upper float 48 operates a pilot valve 50 having a gas supply inlet conductor 51 and a gas discharge connector 52, and being connected to the upper diaphragm 53 of a four-way valve 54 by a conductor 55. Similarly, the lower float 49 operates a pilot valve 56 having a gas supply inlet conductor 57 and a gas discharge conductor 58, and being connected to the lower diaphragm 59 of the valve 54 through a conductor 60.

The pilot valves 50 and 56 are of conventional structure and are illustrated as to general arrangement in Fig. 5 of the drawings. In this type of valve, a pilot gas outlet conductor 61 is constantly open to the interior of the valve housing 62 which is provided with an upper seat 63 leading to an upper conductor 64 and a lower seat 65 leading to a lower conductor 66. A double ended valve core 67 is pivotally or otherwise movably mounted within the housing 62 so as to be moved upwardly by the downwardly moving float 68 to engage the seat 63 and shut off the conductor 64, or to be moved downwardly by an upwardly moving float to engage the seat 65 and shut off the conductor 66. Thus, when the upper float 48 moves upwardly, the valve 50 shuts off the vent 52 and admits pilot gas under pressure from the conductor 51 to the conductor 55. As this upper float moves downwardly, it shuts off the supply of pilot gas and vents the gas under pressure from the conductor 55 through the conductor 52. Similarly, upward movement of the lower float 49 shuts off the gas supply conductor 57 and vents the conductor 60 through the vent pipe 58, and downward movement of the float 49 shuts off the vent 58 and supplies pilot gas under pressure from the conductor 57 to the conductor 60.

The four-way valve 54 is illustrated in Fig. 3 and includes a valve housing 69 carrying the diaphragms 53 and 59 on the upper and lower portions thereof. The housing is provided with an axial bore 70 through which the diaphragms 53 and 59 are connected by a multiple piston valve rod 71. A pilot gas supply conductor 72 opens into the central portion of the bore 70, and upper and lower pilot gas outlets 73 and 74, respectively, open from the bore 70 at points above and below the central portion thereof. Upper and lower exhaust ports 75 and 76, respectively, open from the ends of the bore 70, and may exhaust directly to the atmosphere, or may receive vent gas conductors (not shown).

The valve rod 71 carries a central piston 77, an upper piston 78, and a lower piston 79. The three pistons are so positioned upon the valve rod as to place the conductors 72 and 73 in communication when the rod is in its downward position, while exposing the conductor 74 to the lower vents 76. Conversely, when the rod is in its upper position, the conductors 72 and 74 are placed in communication while the conductor 75 is exhausted through the vent 76. There are no springs affecting movement of the rod 77, and obviously, when pressure is applied to the upper diaphragm 53, the valve will be moved to its lower position, while application of pressure to the lower diaphragm 59 will move the valve to its upper position.

The lower pilot gas conductor 74 is connected to the upper side of the diaphragm housing 81 of the three-way valve 39, and the upper pilot gas conductor 73 is connected to the lower side of the diaphragm housing. The valve 39 is conventional in structure and is arranged so that downward movement of its valve core by corresponding downward movement of the valve diaphragm (not shown) will place the conductor 38 of the valve in communication with the clean oil inlet conductor 32, and upward movement of the valve core of the three-way valve 39 will place the conductor 38 in communication with the clean oil outlet conductor 40. Of course, any conventional and usual three-way valve structure may be employed, and since the conductors 73 and 74 may be selectively connected to either side of the diaphragm of the three-way valve, it is immaterial which direction of movement admits clean oil to the accumulator shell 35 and which direction of movement exhausts clean oil therefrom.

In the measuring of the volume of oil discharged from the emulsion treating vessel 10, the shell 35 fills with clean oil through the valve 39 until the upper float 48 is raised. At this point, the position of the valve 39 is shifted and clean oil is discharged from the shell 35 until the lower float 49 falls, at which time the position of the valve 39 is again reversed and filling of the shell 35 again commences. The interior of the shell 35 being of fixed volume, and the levels at which the upper and lower floats 48 and 49 are actuated being constant, a known volume of clean oil is discharged with each cycle, and hence, it is only necessary to record the number of times the shell 35 fills and empties. For recording the number of filling cycles, a conventional lever-operated counter 82 is provided and has its lever 83 connected to a pressure-actuated structure, such as the diaphragm unit 84 which, in turn, is connected by a pipe 85 to the conductor 73. Thus, each time pilot gas under pressure is supplied to the pipe 73, it is also supplied at the pipe 85, and through the diaphragm unit 84 will advance the counter 82 one unit. In this manner, an accurate and reliable, as well as automatic record of the number of filling and emptying cycles of the shell 35 is maintained.

In the operation of the metering arrangements, the shell 35 will commence to fill with clean oil, thus raising the float 49 and venting the conductor 60. This will relieve the pressure on the diaphragm 59, but will not result in movement of the four-way valve 54 since the valve core 71 thereof is not subjected to any spring action. At this time, the float 48 will be in its lower position in which the conductor 55 also is vented, but will be ready to receive pilot gas under pressure for downward movement of the pilot valve 54.

When the oil reaches the level of the upper float 48 and lifts the same, the vent 52 will be closed and the pilot gas supply conductor 51 uncovered to supply pilot gas through the conductor 55 to the diaphragm 53 and move the valve 54 to its lower position. Thus, pilot gas under pressure will be admitted from the conductor 72 to the conductor 73 actuating the counter 82 and moving the core of the valve 39 upwardly to shut off admission of clean oil from the pipe 32 and commence the discharge of oil through the outlet conductor 40. The float 49 will remain elevated, but as the liquid level commences to fall within the shell 35, the float 48 will drop. This shuts off the supply of pilot gas through the conductor 51 and vents the conductor 55 through the vent pipe 52, but again, no movement of the valve 54 will take place. When the oil level reaches the lower float 49 and allows the same to drop, the vent 58 will be closed off, and pilot gas under pressure will be admitted from the pipe 57 to the pipe 60 to move the lower diaphragm 59 upwardly and shift the valve 54 into its upper position. In this position, pilot gas is supplied from the conductor 72 to the conductor 74 for moving the core of the valve 39 downwardly, thus shutting off discharge through the outlet pipe 40 and again admitting clean oil through the inlet pipe 32. Of course, at any time pressure is applied to either side of the diaphragm of the valve 39, the other side of the diaphragm will be vented through either the ports 76 or the ports 77 of the valve 54.

It is pointed out that the shell 35 will drain rather rapidly due to the size of the valve 39 and the discharge conductor 40, and since the clean oil is not only under a considerable hydrostatic head within the shell 35 but is also subjected to the pressure existent within the treating vessel. Thus, there will be relatively short periods during which the shell 35 does not contain an appreciable quantity of oil, and throughout the major portion of the cycling operation, clean oil will be flowing from the vessel 10 into the shell 35 for effective and efficient heat exchange with the incoming emulsion stream. Of course, during the period the shell 35 is draining, clean oil will be accumulating within the vessel 10 for immediate and rather rapid discharge into the shell when the position of the valve 39 is shifted. This oil, however, will be retained within the shell for some considerable period of time as the shell is filling completely and will undergo effective cooling and transfer of its heat content to the incoming emulsion stream. The emulsion stream flows constantly through the combination heat exchange and metering structure, or in accordance with the rate of flow of the producing well, and the admittance of the emulsion stream into the treating vessel is at no time impeded or hindered in any fashion. Thus, insofar as the inflow of an emulsion stream to the treater is concerned, the metering of the clean oil has no effect, and virtually continuous pre-heating of the incoming emulsion stream is maintained. Likewise, effective cooling of the effluent clean oil is achieved, no appreciable effect upon the operation of the treating vessel is observed, and substantially normal heat exchanging and emulsion treating operations are carried out.

For removing separated water from the vessel 10, there is provided a combined water leg and water metering structure 86 which includes an elongate vertical shell 87 mounted on one side of the emulsion treating vessel. A water outlet pipe 88 extends from the lower portion of the vessel 10, through the side wall thereof and through the wall of the shell 87 near its lower end, and thence upwardly through a transverse partition 89 in the upper portion of the shell 87 to a point near the top of said shell. A port or window 90 cut in the upper portion of the pipe 88 above the partition 89 permits water to overflow into the shell above said partition.

The lower portion of the shell forms a metering chamber, and a drain pipe 91 extends from the shell immediately above the partition 89, downwardly through the interior of the emulsion treating vessel 10, and out through the wall of the vessel immediately above the bottom head 12 for connection to the inlet 92 of a three-way valve 93 similar to the valve 39. An outlet pipe 94 is also connected to the valve 93 for discharge of water from the interior of the shell 87, and the branch conductor 94 of the valve 93 is connected into the interior of the shell through the bottom thereof. A lower float 96 is positioned within the shell closely above the bottom end thereof, and an upper float 97 is positioned within the upper part of the shell closely beneath the partition 89. These floats operate pilot valves 98 connected to a switching valve 99 which, in turn, operates a counter device 100 and selectively applies pilot gas under pressure to the diaphragm unit 101 for switching the valve 93 between its upper and lower positions. The float and valve mechanism operates in all respects in the same manner as that described in connection with the volumetric measuring of the clean oil production, the lower portion of the vessel 87 alternately filling and emptying with water as the same is removed from the interior of the vessel 10. Here again, a constant volume of water is measured for each cycle, and the number of cycles is recorded by the counter 100 so that an exact and accurate record of the volume of separated water is maintained.

A modified form of the invention is illustrated in Fig. 2 in which more extensive heat exchange surface is provided for cooling of the clean oil and warming of the influent emulsion stream. In this structure, the emulsion treating vessel 102 is provided with an upper head 103, a bottom 104 and an intermediate partition 105 spaced below the head 103. A mist extractor 106 is provided on the under side of the head 103 and communicates with a gas outlet pipe 107 while a condensate drain pipe 108 leads downwardly from the mist extractor to a point near the upper surface of the partition 105. A drain connection 109 leads from the central part of the partition 105 into a downwardly-extending flume 110 having its upper end provided with an overflow pipe 111 projecting an appreciable distance above the partition 105. The lower end of the flume 110 opens into an open bottom box 111' having therein a skimming and trap structure 112 for collecting the emulsion stream and directing it upwardly through upstanding outlet pipes 113. A conventional heater structure 114 is provided in the vessel above the box 111, and a hay or excelsior section 115 may be positioned in the vessel above the heating unit. A water outlet pipe 116 leads from the lower portion of the vessel immediately above the bottom 104 thereof, and a sand ejector nozzle structure 117 may also be provided in the bottom of the vessel along with a conventional sand ejection unit 118.

An elongate upright heat exchanger and metering chamber 119 is mounted on the side of the vessel 102 and includes an upper tube sheet 120 and a lower tube sheet 121 between which heat exchanger tubes 122 extend. The emulsion stream is admitted to the heat exchanger through the bottom inlet 123 opening into the heat exchanger below the tube sheet 121 so that the emulsion stream is caused to flow upwardly through the tubes 122. A discharge conductor 124 leads from the upper end of the heat exchanger above the upper tube sheet 120 to a diverter inlet 125 in the upper portion of the emulsion treating vessel for introducing the pre-heated emulsion stream into the vessel immediately below the upper head 103.

A clean oil skimmer box 126 is provided in the treating vessel immediately below the partition 105 and communicates through a clean oil outlet pipe 127 and a diaphragm-operated valve 128 with the upper portion of the heat exchanger immediately below the upper tube sheet 120. A clean oil outlet pipe 129 leads from the lower portion of the heat exchanger immediately above the lower tube sheet 121 through a diaphragm-operated valve 130, and thus, provision is made for the flow of hot clean oil into the upper portion of the heat exchange zone and draining of the cooled oil from the lower portion of said zone.

The heat exchanger is provided with an upper float 131 mounted in a float housing 132 exteriorly positioned of the heat exchanger shell but communicating therewith through upper and lower pipes 133 and 134, respectively. The shell is also provided with a lower float 135 similarly mounted in a housing 136 which communicates with the shell through upper and lower pipes 137 and 138. These floats are substantially identical to the upper and lower floats 48 and 49 previously described, and operate pilot valves 139 and 140, respectively, which, in turn, operate a switching valve 141 substantially identical to the valve 54. The valve 141, in turn, controls the supplying of pilot gas under pressure through a branched conductor 142 leading to the diaphragm-operated counter 143, the upper side of the diaphragm housing 144 of the valve 128, and the lower side of the diaphgram housing 145 of the valve 130. The switching valve 141 also has a branched conductor 146 leading to the underside of the diaphragm housing 144 and the upper side of the diaphragm housing 145. Thus, in one position of the valve 141, the upper valve 128 is closed while the lower valve 130 is openend and the counter is actuated. In the other position of the valve 141, the lower valve is closed and the upper valve is opened. Of course, the floats 131 and 135 operate in the same fashion as the floats 48 and 49 to control the switching valve 141 and cause the interior of the heat exchanger to alternately fill with warm clean oil and empty of cool clean oil with the counter being actuated on each dumping cycle. It is apparent that the operation of this float and valve system and the filling and emptying of the heat exchanger shell of known interior volume is carried out in substantially identical fashion to that previously described in conjunction with the first form of the invention.

In both modifications of the emulsion treater, the heat exchanger shell is employed not only for heat exchanging between the incoming emulsion stream and the outgoing clean oil with all of its beneficient advantages, but is also employed as a rather accurate and exact volume chamber for measuring of the volume of the clean oil which is produced and a continuous and automatic recording of such volume through actuation of the counter mechanism. The normal and proper functioning of the emulsion treater vessel is not impaired in any manner, the beneficial results of heat exchanging are retained, and in addition, an accurate record of the volume of the reduced clean oil is maintained. Of course, in either form of the invention, a continuous and automatic record of the volume of separated water may also be maintained, along with automatic recording of the volume of separated gas. In the second modification of the invention, the treater is shown merely with the water outlet conductor 116, which may be connected to a simple water leg outlet, to any other type of outlet control structure, or to a volume recording arrangement such as shown in Fig. 1. This treater may also be provided with the sand jets 117 and the sand ejector 118 for the removal of accumulated solids from the bottom of the emulsion treating vessel.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A metering emulsion treater including, an emulsion treater vessel having an emulsion stream inlet and gas and water and clean oil outlets, means in the vessel for resolving an emulsion stream into its water and clean oil components, a heat exchanger forming a part of the emulsion treater and having separate emulsion stream and clean oil flow passages in heat exchange relationship, an emulsion stream inlet to the emulsion stream flow passage of the heat exchanger, an emulsion outlet conductor between the emulsion stream flow passage and the emulsion stream inlet of the vessel, a clean oil conductor between the oil outlet of the vessel and the clean oil flow passage of the heat exchanger, a clean oil outlet from said clean oil passage, means for alternately filling and emptying said clean oil passage with clean oil between predetermined levels, and means for recording the number of times said clean oil passage is filled and emptied.

2. A metering emulsion treater as set forth in claim 1 wherein the means for alternately filling and emptying the clean oil flow passage with clean oil between predetermined levels includes, valve means for admitting clean oil from the vessel to the clean oil flow passage and for discharging clean oil from the latter passage, an upper liquid level responsive means exposed to the clean oil flow passage for controlling the flow of clean oil to said passage from the vessel through the valve means, and a lower liquid level responsive means exposed to the clean oil flow passage for controlling the discharge of clean oil from the latter passage through the valve means.

3. A metering emulsion treater as set forth in claim 1 wherein the means for alternately filling and emptying the clean oil flow passage with clean oil between predetermined levels includes, valve means for admitting clean oil from the vessel to the clean oil flow passage and for discharging clean oil from the latter passage, an upper float means exposed to the clean oil flow passage for controlling the flow of clean oil to said passage from the vessel through the valve means, and a lower float means exposed to the clean oil flow passage for controlling the discharge of clean oil from the latter passage through the valve means.

4. A metering emulsion treater as set forth in claim 1, and means for metering the water separated from the emulsion stream while maintaining the volume of water present within the emulsion treater vessel substantially constant including, a water discharge enclosure forming a part of the emulsion treater for maintaining the predetermined water level in the vessel, a water volume enclosure forming a part of the emulsion treater, the water discharge enclosure communicating with the water outlet from the vessel, means for alternately filling and emptying the water volume enclosure between predetermined levels with water from the water discharge enclosure, and means for recording the number of times the water volume enclosure is filled with and emptied of water.

5. A metering emulsion treater as set forth in claim 1 wherein the means for alternately filling and emptying the clean oil flow passage with clean oil between predetermined levels includes, valve means for admitting clean oil from the vessel to the clean oil flow passage and for discharging clean oil from the latter passage, an upper liquid level responsive means exposed to the clean oil flow passage for controlling the flow of clean oil to said passage from the vessel through the valve means, a lower liquid level responsive means exposed to the clean oil flow passage for controlling the discharge of clean oil from the latter passage through the valve means, and means for metering the water separated from the emulsion stream while maintaining the volume of water present within the emulsion treater vessel substantially constant including, a water discharge enclosure forming a part of the emulsion treater for maintaining the predetermined water level in the vessel, a water volume enclosure forming a part of the emulsion treater, the water discharge enclosure communicating with the water outlet from the vessel, means for alternately filling and emptying the water volume enclosure between predetermined levels with water from the water discharge enclosure, and means for recording the number of times the water volume enclosure is filled with and emptied of water.

6. A metering emulsion treater as set forth in claim 1 wherein the means for alternately filling and emptying said clean oil flow passage with clean oil between predetermined levels includes, first valve means for admitting clean oil from the vessel to the clean oil flow passage and for discharging clean oil from the latter passage, an upper liquid-level responsive means exposed to the clean oil flow passage for controlling the flow of clean oil to said passage from the vessel through the first valve means, a lower liquid-level responsive means exposed to the clean oil flow passage for controlling the discharge of clean oil from the latter passage through the first valve means, a first recorder for recording the number of times clean oil is admitted to the clean oil flow passage and discharged therefrom, a water discharge enclosure communicating with the water outlet from the emulsion treater vessel and forming a part of the emulsion treater for maintaining a predetermined water level in the vessel, a water volume enclosure forming a part of the emulsion treater, second valve means for admitting water from the water discharge enclosure to the water volume enclosure and for discharging water from the latter enclosure, an upper liquid-level responsive means exposed to the water volume enclosure for controlling the flow of water from the water discharge enclosure to the water volume enclosure through the second valve means, a lower liquid-level responsive means exposed to the water volume enclosure for controlling the discharge of water from the latter enclosure through the second valve means, and a recorder for recording the number of times the water volume enclosure is filled and emptied of water.

References Cited in the file of this patent

UNITED STATES PATENTS

| | | |
|---|---|---|
| 2,022,695 | Stuart | Dec. 3, 1935 |
| 2,158,381 | Raymond | May 16, 1939 |
| 2,181,684 | Walker | Nov. 28, 1939 |
| 2,225,949 | Bennett | Dec. 24, 1940 |
| 2,420,115 | Walker et al. | May 6, 1947 |
| 2,773,556 | Meyers et al. | Dec. 11, 1956 |

OTHER REFERENCES

Publication in Oil and Gas Journal, June 11, 1956, vol. 54, No. 58, pp. 112–114.